United States Patent [19]

Brown et al.

[11] 4,053,085

[45] Oct. 11, 1977

[54] DISSIMILAR MATERIALS SEAL FOR HIGH PRESSURE, HIGH TEMPERATURE AND CHEMICALLY REACTIVE ENVIRONMENTS

[75] Inventors: David Brown, Cambridge; Reginald Tobias, Watertown, both of Mass.

[73] Assignee: Block Engineering, Inc., Cambridge, Mass.

[21] Appl. No.: 621,403

[22] Filed: Oct. 10, 1975

[51] Int. Cl.² .............................................. B25D 53/02
[52] U.S. Cl. ...................................... 220/378; 277/22; 277/142; 277/160; 277/198
[58] Field of Search ................. 277/22, 160, 195, 214, 277/142, 165, 143, 198, 110; 73/23.1; 220/378

[56] References Cited

U.S. PATENT DOCUMENTS

| | | | |
|---|---|---|---|
| 2,300,519 | 11/1942 | Phillips | 277/160 |
| 2,562,675 | 7/1951 | Mayfield | 277/160 |
| 3,300,225 | 1/1967 | Shepler | 277/165 |
| 3,334,774 | 8/1967 | Poltorak | 220/378 |
| 3,521,891 | 7/1970 | Tripoli | 277/110 |

Primary Examiner—Charles E. Phillips
Assistant Examiner—L. Footland
Attorney, Agent, or Firm—Robert L. Slater, Jr.

[57] ABSTRACT

A seal apparatus for making demountable gas tight seals between juxtaposed dissimilar material parts in high temperature, high pressure and chemically reactive environments. The seal is comprised of two or more concentric elastomer washer seals mounted in a first juxtaposed part within a recessed channel of measured depth. The washer seals have a thickness greater than the measured depth of the channel, thereby providing contact with the second juxtaposed part interfaced with the first or channeled part. The inner concentric elastomer washer, being made of chemically relatively inert material, and the outer concentric elastomer washer being made of high resilient, therefore relatively chemically reactive material. The outer concentric washer seal is the true load bearing seal; the inner seal is a means for shielding the load bearing seal from chemical deterioration. A flexible annular metal contactor mounted exterior to the outermost concentric washer seal thermally contacts both juxtaposed parts and maintains thermal equilibrium there between.

4 Claims, 3 Drawing Figures

DISSIMILAR MATERIALS SEAL FOR HIGH PRESSURE, HIGH TEMPERATURE AND CHEMICALLY REACTIVE ENVIRONMENTS

CROSS REFERENCE TO RELATED APPLICATION

Tomas Hirschfeld and David Brown
For: Gas Chromatograph Device
Ser. No.: 553,987
Filed: Feb. 28, 1975

BACKGROUND OF THE INVENTION

1. Field of Invention

The present invention relates to means for achieving fluid tight seals between juxtaposed mechanical components under conditions of severe heat, high pressure and reactive chemical environments. In particular, the present invention pertains to high pressure, high temperature and chemically passive gas tight demountable seals between dissimilar materials.

Chemical incompatibility at elevated temperatures between juxtaposed but dissimilar material parts may be circumvented by mechanically isolating the incompatible parts with suitably selected gasket and sealing material. However, chemical incompatibility, as between the gasket seal material, on the one hand, and the contained fluid or gases, on the other hand, is a substantially more difficult problem to overcome. Earlier extreme condition sealing arrangements have not been altogether adequate for many applications. One specific severe condition application where the conventional seal apparatus proved inadequate, may be found in high temperature and high pressure sample containers for infrared spectrophotometer chemical analysis.

Accordingly, there is an existing need and requirement for a long life demountable secure fluid tight seal for juxtaposed mechanical parts suitable for high temperature, high pressure and chemically reactive environments. Moreover, it is further required that such seal be fully effective when the juxtaposed parts are made of dissimilar materials, and that the seal apparatus does not excessively stress the juxtaposed parts mechanically thermally or in any other respects.

2. DESCRIPTION OF PRIOR ART

Interfaces of dissimilar materials, such as metal and non-metal parts when a fluid or gas tight seal is desired, is readily achieved between chemically compatible materials at ambient temperatures and pressures. An elastomer "0" ring washer or shaped elastomer gasket seal compressed between matched interfaces of two dissimilar material parts will normally provide a gas tight seal. However, as chemical incompatibility, higher temperature and higher pressure factors are introduced, the aforesaid conventional elastomer sealing means becomes less secure and less dependable during extending service.

While numerous novel and generally effective sealing means have been devised to secure under extreme conditions of temperature and pressure fluid tight seals between juxtaposed parts made of dissimilar materials, these earlier extreme condition sealing means resulted in substantial thermal isolation of the juxtaposed parts. As a result, with conventional sealing means, gas tight sealing may be achieved but sharp thermal gradients and excessive mechanical strain, on one or both of the juxtaposed parts, is likely to be encountered. When one of the juxtaposed parts is transparent to radiant energy, as in the visible or infrared spectrum, the presence of severe thermal gradients distorts and alters adversely the radiation transmission properties of the transparent material. Crystalline and non-metal material parts during pressure and temperature cycle extremes are often fragile. Excessive mechanical and thermal stresses will often cause breakage.

OBJECTS AND ADVANTAGES OF THE INVENTION

One object, therefore, of my invention is to provide a secure fluid tight demountable seal apparatus for juxtaposed parts of dissimilar materials for use in high temperature, high pressure and chemically reactive environments.

Another object of my invention is to provide a secure fluid tight seal apparatus for juxtaposed dissimilar material parts wherein the sealed juxtaposed parts are not thermally isolated.

Yet another object of my invention is to provide a demountable seal apparatus for dissimilar material parts wherein the seal apparatus during high temperature and high pressure usage does not induce excessive stress of any kind of either juxtaposed part.

These and other objects and advantages of my invention will be apparent from the following specifications, drawings and claims.

SUMMARY OF THE INVENTION

The present invention provides a gas tight demountable apparatus for sealing interfaced surfaces of dissimilar materials under conditions of high temperature, high pressure and reactive chemical environments. The invention, while achieving an efficient seal, avoids occurrence of excessive mechanical or thermal stresses on the interfacing parts, one or both of which may be fragile during temperature and pressure cycle extremes. The invention comprises two concentric annular seals mounted between interfacing part surfaces. The first or inner concentric seal is provided with chemically resistant surfaces, the second or outer concentric seal is resilient and is the true load bearing seal. The inner concentric seal serves to shield the outer from reactive chemical environments. A flexible thermal conductive member is mounted in thermal contact with both interfaced parts concentric with and exterior to the outermost concentric seal. The concentric thermal conductor conunterbalances the thermal isolation between the interfaced parts due to the seals there between.

DETAILED DESCRIPTION OF THE INVENTION

Figure 1:
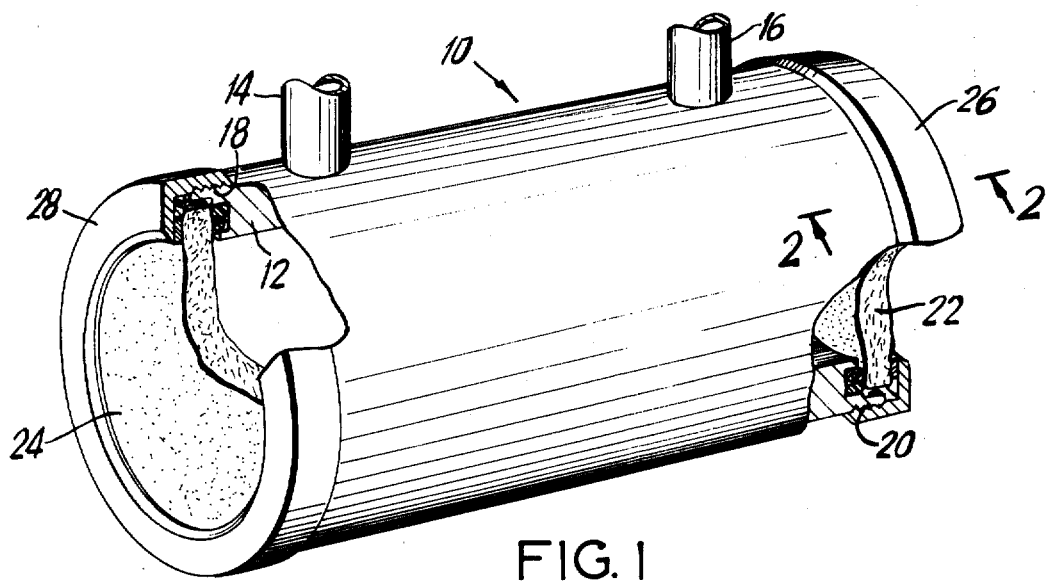
FIG. 1 is a partially cutaway perspective view of a typical application of one preferred embodiment of my invention.

Referring now to the drawings, FIG. 1 illustrates a preferred embodiment of my invention applied to a sample chamber for collecting eluted chemical samples, such as, from a gas chromatograph. The illustrated sample chamber is adapted for holding the sample, while additional analytic tests are performed, such as for instance, during infrared absorption spectrophotometer analysis. The sample chamber illustrated in the drawings, its associated gas chromatograph apparatus and its operation is described in the U.S. patent application of TOMAS HERSCHFELD and DAVID BROWN, titled GAS CHROMATOGRAPH DEVICE, Ser. No. 553,987, filed Feb. 28, 1975.

The sample chamber 10 is comprised of a hollow thick walled metal cylinder 12 having a radially positioned input port 14 and spaced therefrom an output port 16. The cylinder is provided with exterior threaded sections 18 and 20 at either end thereof. The cylinder 12 is closed at either end, respectively, by means of flat disks of crystalline sodium chloride 22 and 24 held in their respective positions by threaded end retainers. The crystalline disks, as will be described below, are sealed to the cylinder ends; the apparatus and manner of effecting the seals comprise the subject matter of my invention.

The sample chamber, as described above thus far, is similar to sample chambers or cells known and used heretofore. Such cells are operated at high and low temperatures, often under high internal pressure conditions and when containing highly corrosive and chemically reactive vapors.

The crystalline windows or disks 22 and 24 are fragile. Due to breakage, deterioration and other reasons, replacement at intervals is required. The embodiment, described here, illustrates application of my invention with sodium chloride crystalline infrared window material. However, other commonly used window materials are equally applicable, and for certain infrared frequencies, more desirable. Examples of other common infrared window materials with which my invention is particularly useful are potassium bromide, silver chloride, caesium iodide, calcium fluoride, sintered magnesium fluoride and others.

The cylinder 12 and other metal parts of the sample chamber illustrated are made of stainless steel, the most common sample cell material. However, carbon steel, bronze, glass and other dense machineable or moldable materials are also suitable. My novel seal invention will prove useful when applied to sealing almost any sample cell material component parts to any of the aforesaid available window materials.

Figure 2:
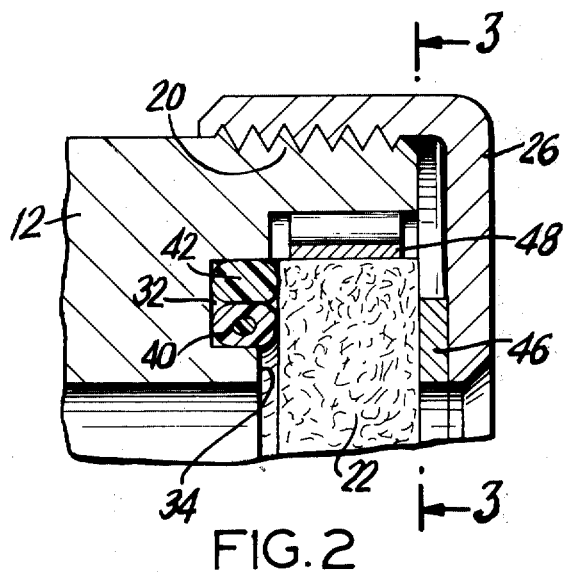
FIG. 2 is an enlarged view of a fragment of the embodiment of my invention shown in FIG. 1.

FIG. 2 shows the preferred embodiment of my invention in enlarged cross section. A rectangular channel 32 has been cut, a measured depth, into surface 34 of the cylinder. The metal surface 34 is juxtaposed and must be sealed gas tight to the crystalline sodium chloride disk 22. Frequently in common practice, chemically active vapors will be retained at elevated pressures and temperatures within the interior of the cylinder 12.

Two concentric elastomer "O" ring washers 40 and 42, respectively, are mounted within the channel 32. The "O" ring washers in cross section, as shown in the illustrations, are thicker than the measured depth of the channel 32. Accordingly, when mounted within the channel, as shown, the concentric "O" ring washers, 40 and 42, extend well above the surface 34. The crystalline sodium chloride disk 22 seals against the "O" ring washers 40 and 42 and is juxtaposed in spaced relationship with surface 34 of the cylinder 12. The inner "O" ring washer 40 is exposed to the sample vapors and must be selected, or appropriately coated, to resist chemical deterioration. The "O" ring washer 40 isolates the outer concentric "O" ring washer 42 from the reactive chemical vapors contained within the sample cell. The outer concentric "O" ring washer 42 is the principal load bearing seal and is selected from materials having high resilience and long lasting elastomeric characteristics.

The outer or load bearing "O" ring washer 42 may be made from any of a number of resilient neoprene or floro polymer elastomers or similar resilient material. However, most resilient elastomers are relatively readily attacked by many chemicals and deteriorate, or worse, contaminate the interior of the sample cell with chemical reaction degradation products. The inner concentric "O" ring washer 40 may be made from VITON A, a proprietary chemically stable floro elastomer manufactured by E. I. DuPont Company. The seal shown in the illustrations is a VITON A ring coated with teflon. Metallic gold coating may be substituted for teflon coating for resisting the most highly reactive chemicals. The teflon or metal coated "O" ring washers are relatively rigid, and if used as the load bearing seal, would locally mechanically over stress the crystalline disk 22. The more resilient outer washer 42 distributes the contact surface over a wider area and thus, avoids high stress contact with the crystal surfaces. The seal compression is achieved by tightening the threaded retainer 26 against the crystal 22. A flexible inert material load bearing pad 46 separates the crystal sodium chloride from the metallic retainer 26.

The crystalline sodium chloride is sealed gas tight to the metallic cylinder surface 39 by the aforesaid seal arrangement, but is thermally insulated by the "O" ring washers 40 and 42 and by the load bearing pad 46, from contact with the metallic cylinder. The temperature of the crystalline disk 22 will deviate significantly from that of the metal parts due to radiant cooling. Maintenance of the crystalline window, at approximately the same temperature as the metal cylinder surface, is important to avoid local thermal stress in the crystal. More important as the crystal window cools, sample vapors may condense on the window and interfere with the analysis process.

Figure 3:
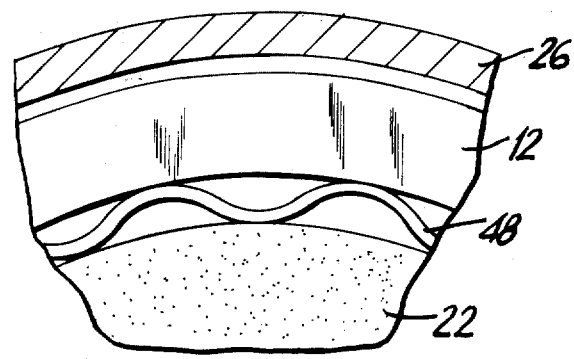
FIG. 3 is a view, taken on the plane 3—3 of a detailed preferred embodiment of my invention shown in FIGS. 1 and 2.

To assure constant temperature conditions within the crystalline window and temperature substantially equal to that of the sample cell metal parts, a thermally conductive flat metal spring 48 is mounted exterior to the outer concentric "O" ring washer seal, 42, in contact with the flattened edge of the window disk 22 and simultaneously in contact with the cylinder wall. The spring heat conductor 48 and its mounting in contact with both window 22 and cylinder wall, may be most readily visualized by reference to FIG. 3. The spring conductor 48 provides a heat conduit between the thick cylinder wall 12 and the crystalline window disk 22 which is sufficient to maintain the window at substantially the same temperature as the cylinder wall.

The foregoing drawings, specifications and descriptions are intended merely as illustrative examples of preferred embodiments of my invention of which numerous variations may be readily devised; the scope and extent of my invention is defined in the following claims.

We claim:

1. A device for demountably sealing a gas tight cover about the periphery of an aperture in a metallic container, the juxtaposed cover and the container being of dissimilar materials, the novel combination comprised of a metallic container having an aperture therein, a cover, the cover being shaped to conform to and close the aperture when juxtaposed thereto, a first and a second gasket seal, the first seal being of chemically resistant material and mounted concentrically with and interiorly to the second seal, the second seal being of load bearing elastomer material, the cover and the container being juxtaposed with the gasket seals there between about the periphery of the aperture in the container, and a generally annular metallic thermal conductor, the thermal conductor being mounted coaxial with and exterior to the second gasket seal and through means in thermal contact with both the cover and the metallic container, whereby the cover may be tightly sealed to the container, the load bearing elastomer seal being protected from reactive chemicals within the container by the presence of the interiorly mounted chemical resistive seal, and the container and its cover being maintained in thermal equilibrium by means of the annular thermal conductor mounted about the periphery of the cover.

2. The device for sealing dissimilar materials of claim 1 wherein the first inner seal and reactive chemical barrier is comprised of a temperature resistive elastomer compound coated with gold.

3. Apparatus for demountably sealing a non metallic crystalline material to a metallic vapor sample container, the crystalline material providing a transparent cover for an aperture within the sample container, the novel combination comprised a metallic container having an aperture therein, a cover of crystalline material, the cover being shaped to conform to the shape of the aperture and to close the aperture when juxtaposed thereto, of a first and a second flexible seal, the first seal being prepared of chemically resistive materials and mounted coaxially and interiorly of the second seal, the second and outer seal being a load bearing elastomer, and a generally annular thermal conductor, the annular thermal conductor being mounted peripherally about the crystalline material cover, in thermal contact with the cover and through means in thermal contact with the metallic sample container, whereby when the crystalline cover is sealedly mounted to the metallic sample container, the first and second seals provide a chemically resistive load bearing seal and the annular thermal conductor maintains thermal equilibrium between the cover and the container to prevent condensation of sample vapor on the surface of the cover.

4. An improved vapor sample cell comprised of a cylindrical metallic container having apertures at either end thereof, concentric shallow channels cut into the ends of the cylinder, non-metallic crystalline electromagnetic radiation window material sealedly mounted to either end of the cylinder, the crystalline window materials being sealed to the container ends and held in thermal equilibrium therewith by means of a first and a second elastomer concentrically mounted "O" ring seals, the "O" ring seals being mounted within the shallow channels, and a generally annular metallic thermal conductor mounted peripherally about the crystalline window and in thermal contact therewith and through means in thermal contact with the metal container, the first and inner seal being of chemically resistive materials and the second and outer seal of load bearing elastomer materials, whereby heated chemically reactive vapor substances may be securely sealed within the sample container during spectral analysis procedures without condensation of sample vapors on the interior surface of the crystalline window.

* * * * *